(12) United States Patent
Eberle

(10) Patent No.: US 6,979,015 B1
(45) Date of Patent: Dec. 27, 2005

(54) TRAILER HITCH ASSEMBLY AND METHOD

(76) Inventor: Ralph Eberle, W. 9722 County U, Elcho, WI (US) 54428

( * ) Notice: Subject to any disclaimer, the term of this patent is extended or adjusted under 35 U.S.C. 154(b) by 0 days.

(21) Appl. No.: 10/872,534

(22) Filed: Jun. 22, 2004

(51) Int. Cl.⁷ .............................................. B60D 1/00
(52) U.S. Cl. ................................. 280/416.1; 280/461.1
(58) Field of Search ......................... 280/416.1, 461.1, 280/456.1, 497, 490.1, 511; D12/162

(56) References Cited

U.S. PATENT DOCUMENTS

| | | | |
|---|---|---|---|
| 3,700,263 A * | 10/1972 | Day ........................ | 280/416.1 |
| 4,426,097 A * | 1/1984 | Livingston ................ | 280/416.1 |
| 4,729,571 A * | 3/1988 | Tienstra .................... | 280/416.1 |
| 5,702,118 A * | 12/1997 | Hanson et al. ........... | 280/491.5 |
| 5,915,714 A * | 6/1999 | Bell et al. ................. | 280/456.1 |
| 6,536,794 B2 * | 3/2003 | Hancock et al. ............ | 280/511 |
| 6,837,510 B1 * | 1/2005 | Karls ....................... | 280/416.1 |

* cited by examiner

*Primary Examiner*—Tony Winner

(57) ABSTRACT

A trailer hitch or hitch bar adapter that simultaneously holds two balls in an upright, usable position. The hitch or hitch bar adapter holds one ball at a first height and a second ball at a second height different from the first. The two balls can be the same or different size to accommodate various sized trailers.

12 Claims, 3 Drawing Sheets

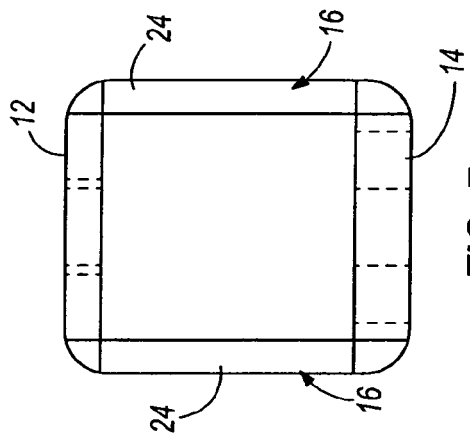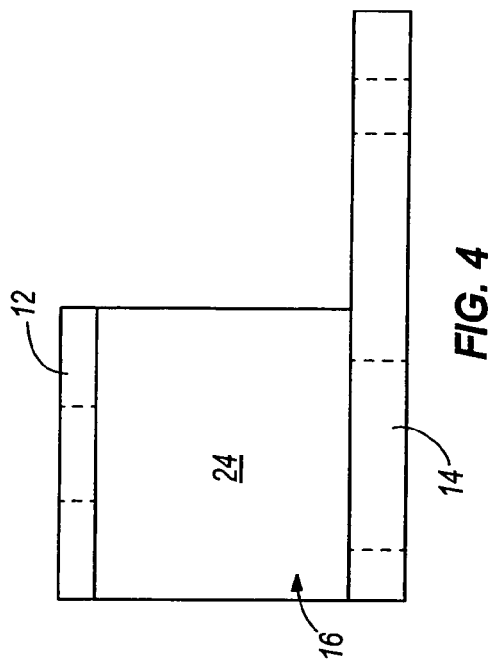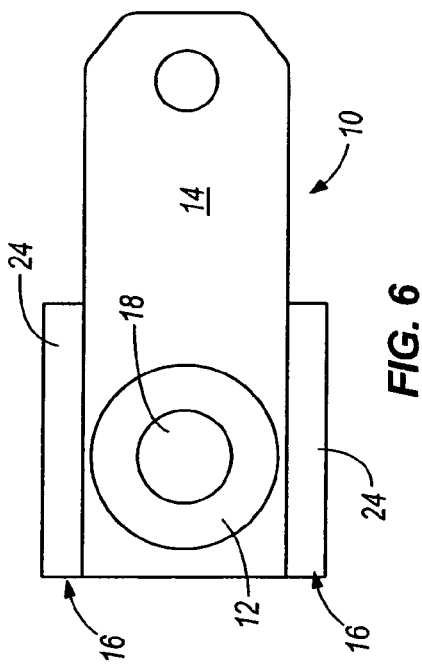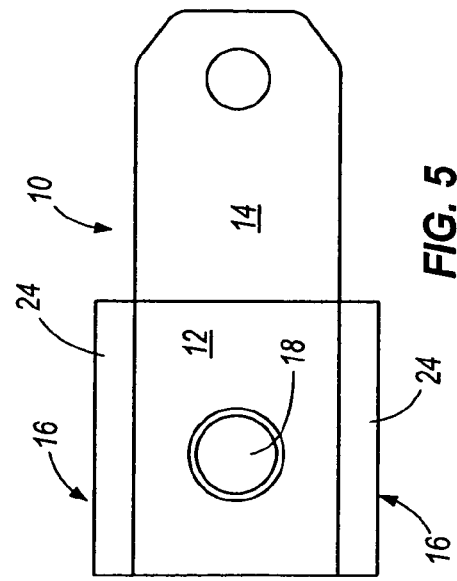

TRAILER HITCH ASSEMBLY AND METHOD

BACKGROUND

It has long been known to construct trailer hitches that are mounted to vehicles in order to allow the towing of trailers or the like. In recent years, such trailer hitches have been designed to include a central frame member or crossbar carrying mounting brackets at each end thereof for mounting the trailer hitch to the frame of the towing vehicle. The trailer hitches also include a receiver box having a rearward directed opening or cavity for the receipt of a hitch or draw bar that carries a hitch ball or other means allowing connection to a trailer.

Different trailers can utilize different sized balls. As such, vehicle owners have had to carry a couple of different sized balls with them. Either the balls could be swapped on the hitch bar, or the owner could keep several hitch bars in their vehicle wherein each hitch bar has a different sized ball. Recently, however, many manufactures have been developing hitch bars that have two different sized balls attached. Typically one ball is inverted with respect to the other. Thus, one still has to flip the hitch bar over to accommodate trailers having different sized balls.

In most situations, it is desirable to have the tongue of a trailer positioned substantially parallel to the ground. However, trailers that utilize larger balls typically need to be coupled to the vehicle at a greater height than a trailer that utilizes a smaller ball to keep the tongue parallel. Thus, manufactures have developed many different types of hitch bars to accommodate this. For example, some hitch bars position the ball mounting location substantially level with the receiver box, while other hitch bars position the ball mounting location in one or more positions below the receiver box. Again, vehicle owners needed to have more than one hitch bar to accommodate more than one type of trailer.

SUMMARY OF THE INVENTION

Some embodiment of the present invention are directed to a multi-ball hitch bar adapter connectable with a hitch bar. The multi-ball hitch bar adapter includes a first plate having a front end, a rear end, and opposite sides, the first plate having an aperture adapted to receive a first trailer hitch ball. The first trailer hitch ball can connect the first plate to the hitch bar. Two side connector plates extend downward from the sides of the first plate. A second plate is coupled to the side connector plates and has an aperture adapted to receive a second trailer hitch ball. The second plate is vertically offset from and substantially parallel to the first plate and the aperture of the second plate is positioned rearward relative to the aperture of the first plate.

Other embodiments are directed to a multi-ball hitch bar adapter having a first plate having a front end, a rear end, opposite sides, and an aperture adapted to receive a first trailer hitch ball. First and second tabs extend from opposite sides of the first plate. The first and second tabs are substantially perpendicular to the first plate. A connector plate is coupled to the rear end of the first plate. A second plate is coupled to the connector plate and has an aperture adapted to receive a second trailer hitch ball. The second plate is vertically offset from and substantially parallel to the first plate and the aperture of the second plate is positioned rearward relative to the aperture of the first plate.

Yet other embodiments are directed to a method of connecting a multi-ball adapter to a hitch bar. The method including aligning an aperture in a first plate with an aperture on the hitch bar; placing the first plate on top of the hitch bar; extending a tab on the first along at least a portion of either side of the hitch bar to prevent rotation of the adapter with respect to the hitch bar; inserting a stem of a ball in the aperture of the first plate and the aperture of the hitch bar; and connecting a fastener to the ball stem to secure the first plate to the hitch bar.

Further embodiments are directed to a multi-ball hitch bar. The multi-ball hitch bar including a first plate having a front end, a rear end, and opposite sides, the first plate also having an aperture adapted to receive a first trailer hitch ball; a connector plate coupled to the rear end of the first plate; and a second plate coupled to the connector plate and having an aperture adapted to receive a second trailer hitch ball, the second plate being vertically offset from and substantially parallel to the first plate and the aperture of the second plate being positioned rearward relative to the aperture of the first plate.

These and other aspects of the present invention, together with the organization and operation thereof, will become apparent from the following detailed description of the invention when taken in conjunction with the accompanying drawings.

BRIEF DESCRIPTION OF THE DRAWINGS

FIG. 4 is a side view of a hitch bar adapter embodying aspects of the invention.

FIG. 5 is a top view of the hitch bar adapter shown in FIG. 4.

FIG. 6 is a bottom view of the hitch bar adapter shown in FIG. 4.

FIG. 7 is an end view of the hitch bar adapter shown in FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

DESCRIPTION OF THE ILLUSTRATED EMBODIMENTS

FIGS. 1–4 illustrate one embodiment a multi-ball hitch bar adapter 10 of the present invention. The multi-ball hitch bar adapter 10 of this embodiment has an upper ball plate 12, a lower ball plate 14 and one or more connector plates 16 located between the upper ball plate 12 and the lower ball plate 14.

Figure 1:
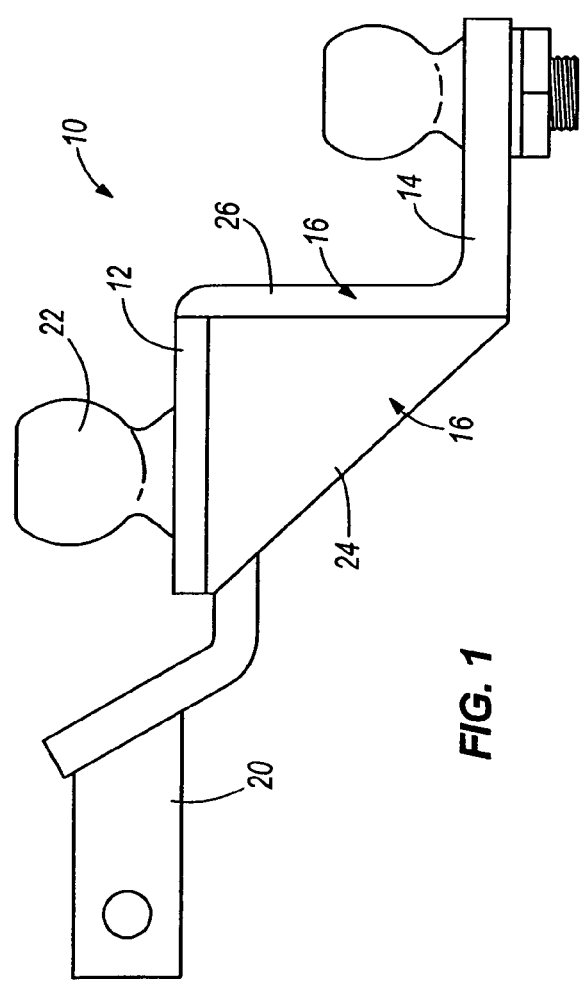
FIG. 1 is a side view of a hitch bar adapter positioned on a hitch bar and embodying aspects of the invention.
Figure 2:
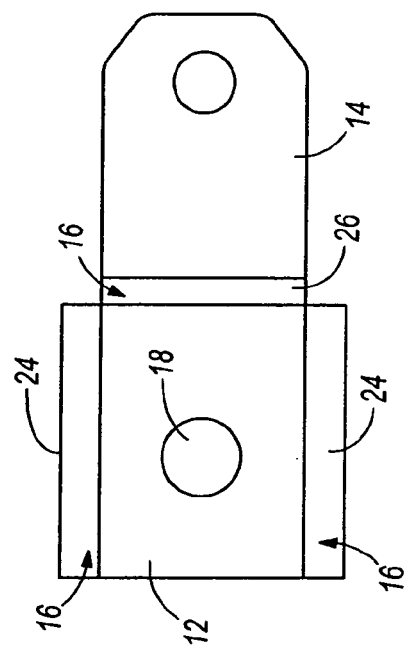
FIG. 2 is a top view of the hitch bar adapter shown in FIG. 1.
Figure 3:
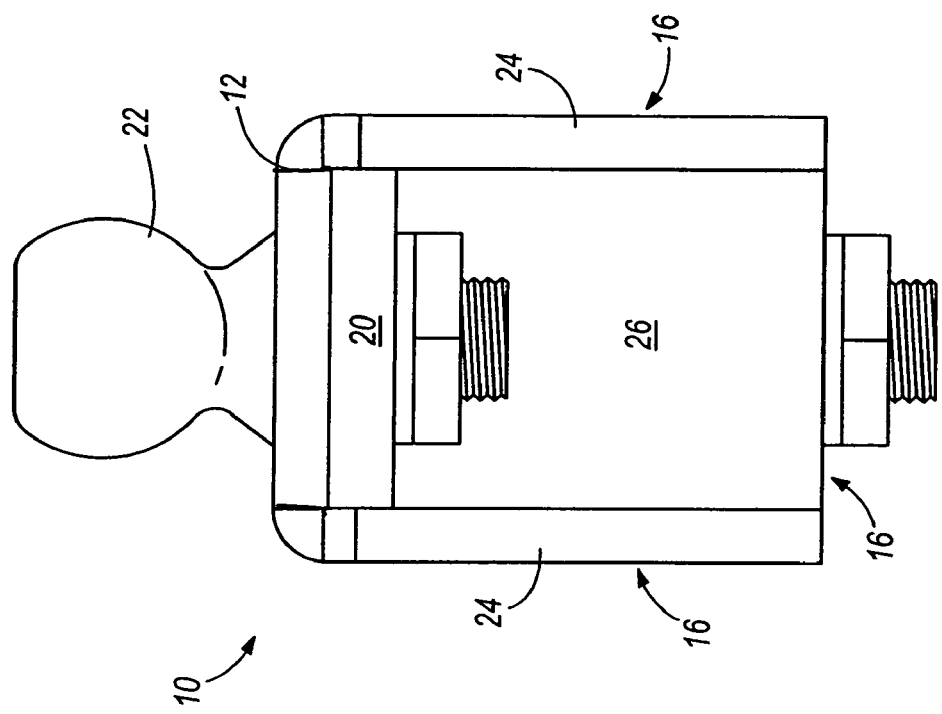
FIG. 3 is an end view of the hitch bar adapter shown in FIG. 1.

As illustrated in FIGS. 1 and 2, the upper ball plate of the multi-ball hitch bar adapter 10 has an aperture 18 that is substantially the same diameter as an aperture in the hitch bar 20. Thus, the upper ball plate 12 can be positioned on top of the hitch bar with the apertures aligned to connect the multi-ball hitch bar adapter 10 to the hitch bar. Furthermore, the stem of the upper ball 22 can be inserted through both apertures and fastened in a conventional manner to secure the multi-ball hitch bar adapter 10 to the hitch bar 20.

A tab 24 extends downward from the upper ball plate 12 on both sides of the hitch bar. These tabs 24 help prevent the multi-ball hitch bar adapter 10 from swiveling relative to the hitch bar 20 when a torque is applied to the lower ball plate 14. Although the tabs 24 illustrated in this embodiment extend along the entire side edge of the upper ball plate 12, in other embodiments the tabs 24 extend along only a portion of this edge.

The tabs 24 extend along the entire side edge of upper plate in this embodiment because they are also part of the connector plates 16. As mentioned above, the connector plates 16 connect the upper plate 12 to the lower plate 14. In this embodiment, a connector plate is located on both sides of the upper plate as well as the rear of the upper plate. In other embodiments, however, one or more of these connector plates 16 can be omitted. The connector plates 16 not only connect the upper and lower plates, but they can also provide strength to prevent the multi-ball hitch bar adapter 10 from substantially deforming. For example, the side connector plates (which are integral with the tabs 24) help maintain the orientation between the upper plate, the lower plate, and the end connector plate 26. As illustrated, the end connector plate is substantially perpendicular to both the upper and lower plate. Without the side connector plates, a substantial load could cause plastic deformation in the orientation between these plates. Although it is not illustrated, in some embodiments, side connector plates can also extend between the end connector plate and at least portions of the lower ball plate 14 for added strength.

The lower plate 14 is connected to the end connector plate. The lower plate 14 also has an aperture sized to receive a ball. The ball can be connected to the lower plate in a conventional manner. As illustrated, the lower plate 14 is substantially parallel to the upper plate 12. However, the two plates 12, 14 are located in different planes. Preferably, the lower plate 14 is located a sufficient distance below the upper plate so that the tongue of a trailer does not hit the lower ball when connected to the upper ball.

As illustrated, the multi-ball hitch bar adapter 10 allows two different sized balls to be attached to the hitch bar. However, the same size ball can be positioned on both plates in some embodiments. Furthermore, unlike conventional hitch bars that have more than one ball, the present invention allows use of both balls without having to flip or rotate the hitch bar. Also, the multi-ball hitch bar adapter 10 of the present invention also provides two different ball-mounting heights on one hitch bar. In some embodiments, a smaller ball can be coupled to the lower ball plate and a larger ball can be coupled to the upper ball plate. As discussed above, this may prove to be quite convenient since trailers that utilize smaller balls tend to also need a dropped hitch to keep the tongue parallel while trailers that utilize larger balls can tend to connect at a non-dropped hitch.

The multi-ball hitch bar adapter 10 can be constructed several ways. For example, it can be cast, molded, and/or formed through bending, stamping, and/or welding. Each plate can be individually cut from stock and welded together along common edges. Additionally, one or more plates can be bent from stock and other plates can be welded. Also, one or more plates can be formed from channel stock and other plates can be welded. These and other variations known to those in the art fall within the spirit and scope of the present invention.

Another embodiment is illustrated in FIGS. 5–7. Like the previous embodiment, this embodiment has an upper ball plate, a lower ball plate, and one or more connector plates between the upper ball plate and the lower ball plate. However, unlike the previous embodiment, this embodiment does not have an end connector plate. Rather, it only has the two side connector plates. Since the end connector plate is omitted, the side connector plates connect directly to the lower ball plate 14. The lower ball plate 14 extends further in this embodiment to accommodate this. Specifically, the illustrated lowers ball plate extends under substantially the entire upper plate. Note that the two plate 12, 14 are spaced apart vertically. Since the connector plates and the lower ball plate reduce access to the ball fastener, an aperture is provided in the front portion of the lower ball plate to allow access for a socket, screwdriver, allen wrench, or other tool.

Note that upper plate in FIG. 5 has a bushing in the aperture. This bushing is removable to accommodate different sized balls. The stem of some larger balls can tend to be greater than others. If a larger stemmed ball is used, the bushing is removed.

In some embodiments, a hitch bar can be designed to have the two offset balls as discussed above. In such a design, the side tabs or side connector plates may not be necessary.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

Various features of the invention are set forth in the following claims.

I claim:

1. A multi-ball hitch bar adapter connectable with a hitch bar, the multi-ball hitch bar adapter comprising:
    a first plate having a front end, a rear end, and opposite sides, the first plate having an aperture adapted to receive a first trailer hitch ball, the first trailer hitch ball connecting the first plate to the hitch bar by extending through the first plate and the hitch bar;
    two side connector plates extending downward from the sides of the first plate; and
    a second plate coupled to the side connector plates and having an aperture adapted to receive a second trailer hitch ball, the second plate being vertically offset from and substantially parallel to the first plate and the aperture of the second plate being positioned rearward relative to the aperture of the first plate.

2. The multi-ball hitch bar adapter of claim 1, further comprising a end connector plate coupled to the rear end of the first plate to a front end of the second plate.

3. The multi-ball hitch bar adapter of claim 2, wherein the end connector plate is coupled to the two side connector plates.

4. The multi-ball hitch bar adapter of claim 1, wherein the aperture in the second plate is a first aperture and the second plate further comprises a second aperture that is substantially aligned with the aperture in the first plate.

5. The multi-ball hitch bar adapter of claim 1, wherein each of the two side connector plates are positioned adjacent opposite sides of the hitch bar to prevent rotation of the hitch bar adapter relative to the hitch bar.

6. A multi-ball hitch bar adapter connectable with vehicle via a hitch bar coupled to the vehicle, the multi-ball hitch bar adapter comprising:
- a first plate having a front end, a rear end, and opposite sides, the first plate also having an aperture adapted to receive a first trailer hitch ball;
- a first and second tab extending from opposite sides of the first plate, the first and second tabs being substantially perpendicular to the first plate and separated from each other by a distance substantially equal to the width of a hitch bar, the hitch bar received between the first and second tab to connect the hitch bar adapter to the vehicle;
- a connector plate coupled to the rear end of the first plate;
- a second plate coupled to the connector plate and having an aperture adapted to receive a second trailer hitch ball, the second plate being vertically offset from and substantially parallel to the first plate and the aperture of the second plate being positioned rearward relative to the aperture of the first plate.

7. The multi-ball hitch bar adapter of claim 6, wherein the tabs extend along substantially the entire length of the opposite sides.

8. The multi-ball hitch bar adapter of claim 7, wherein the tabs also connect to the connector plate.

9. The multi-ball hitch bar adapter of claim 6, wherein the first trailer hitch ball extends through the first plate and the hitch bar to connect the hitch bar adapter to the hitch bar.

10. A method of connecting a multi-ball adapter to a hitch bar, comprising:
- aligning an aperture in a first plate with an aperture on the hitch bar;
- placing the first plate on top of the hitch bar;
- extending a tab on the first plate along at least a portion of either side of the hitch bar to prevent rotation of the adapter with respect to the hitch bar;
- inserting a stem of a ball in the aperture of the first plate and the aperture of the hitch bar; and
- connecting a fastener to the ball stem to secure the first plate to the hitch bar.

11. A multi-ball hitch bar adapter connectable with a hitch bar, the multi-bar hitch bar adapter comprising:
- a first plate having a front end, a rear end, and opposite sides, the first plate also having an aperture adapted to receive a first trailer hitch ball, the first trailer hitch ball extending through the first plate and the hitch bar to couple the first plate to the hitch bar;
- a connector plate coupled to the rear end of the first plate;
- a second plate coupled to the connector plate and having an aperture adapted to receive a second trailer hitch ball, the second plate being vertically offset from and substantially parallel to the first plate and the aperture of the second plate being positioned rearward relative to the aperture of the first plate.

12. The multi-ball hitch bar adapter of claim 11, further comprising a pair of tabs extending from the first plate, the tabs positioned to extend adjacent to sides of the hitch bar to prevent rotational movement of the hitch bar adapter relative to the hitch bar when the hitch bar adapter is mounted on the hitch bar.

* * * * *